A. C. WESTBY.
STOCK WATERER.
APPLICATION FILED DEC. 8, 1919.

1,421,636.

Patented July 4, 1922.

Inventor
A. C. Westby
By his Attorneys
Williamson Merchant

A. C. WESTBY.
STOCK WATERER.
APPLICATION FILED DEC. 8, 1919.

1,421,636.

Patented July 4, 1922.
2 SHEETS—SHEET 2.

Inventor
A. C. Westby
By his Attorneys

UNITED STATES PATENT OFFICE.

ADOLPH C. WESTBY, OF PORTER, MINNESOTA.

STOCK WATERER.

1,421,636.  Specification of Letters Patent.  Patented July 4, 1922.

Application filed December 8, 1919. Serial No. 343,373.

*To all whom it may concern:*

Be it known that I, ADOLPH C. WESTBY, a citizen of the United States, residing at Porter, in the county of Yellow Medicine and State of Minnesota, have invented certain new and useful Improvements in Stock Waterers; and I do hereby declare the following to be a full, clear, and exact description of the invention, such as will enable others skilled in the art to which it appertains to make and use the same.

My invention has for its object to provide a highly efficient stock waterer intended for general use, but especially adapted for watering hogs, and, to this end, it consists of the novel devices and combinations of devices hereinafter described and defined in the claims.

In the accompanying drawings, which illustrate the invention, like characters indicate like parts throughout the several views.

Referring to the drawings: —

Figure 1:
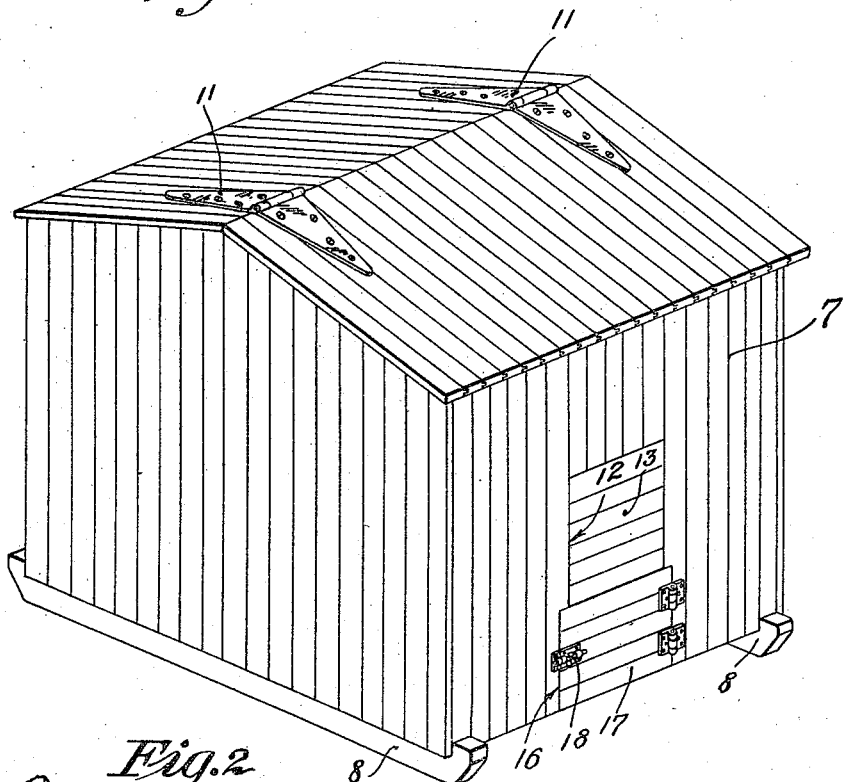
Fig. 1 is a perspective view of the improved stock waterer.
Figure 2:
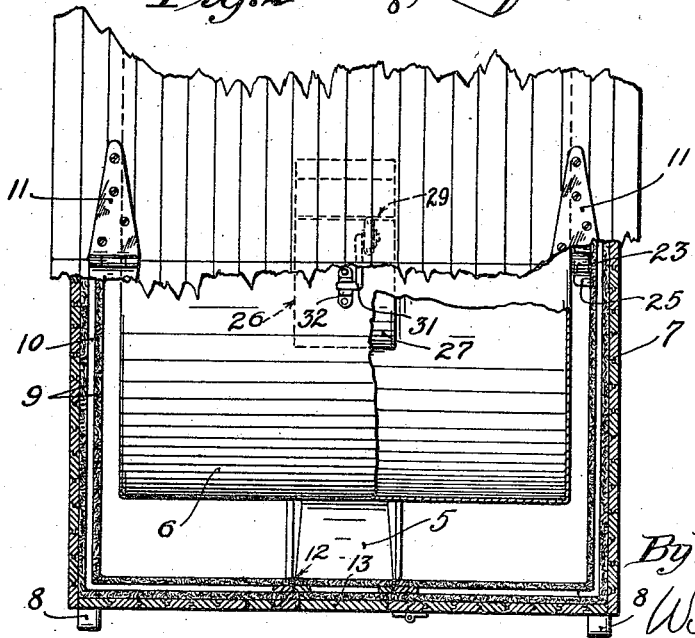
Fig. 2 is a fragmentary view partly in plan and partly in horizontal section.

The improved stock waterer includes a drinking trough 5, a reservoir 6 mounted in an insulated house 7 having a gable roof and the floor of which rests on a pair of sills in the form of runners 8 which permit said house to be moved from place to place. As shown, the floor, walls, roof and doors of the house 7 are made from matched boards and those in the roof extend from the ridge to the eaves to shed water and those in the walls are set on end.

Secured to the inside of the floor, walls and roof of the house are two thicknesses of insulating material 9, spaced apart, to afford an air space 10. Both sections of the roof are connected by strap hinges 11 which permit at least one of said sections to be folded back onto the other thereof, as shown by broken lines in Fig. 4, to afford access to the interior of the house 7 and permit filling of the reservoir 6, as will presently appear.

In each side of the house 7 is formed, at the center thereof, a door opening 12, the bottoms of which are located above the floor of said house. These door openings 12 are normally closed by doors 13 secured at their top edges to the walls of the house 7 by hinges 14 for inward swinging movement.

Figure 4:
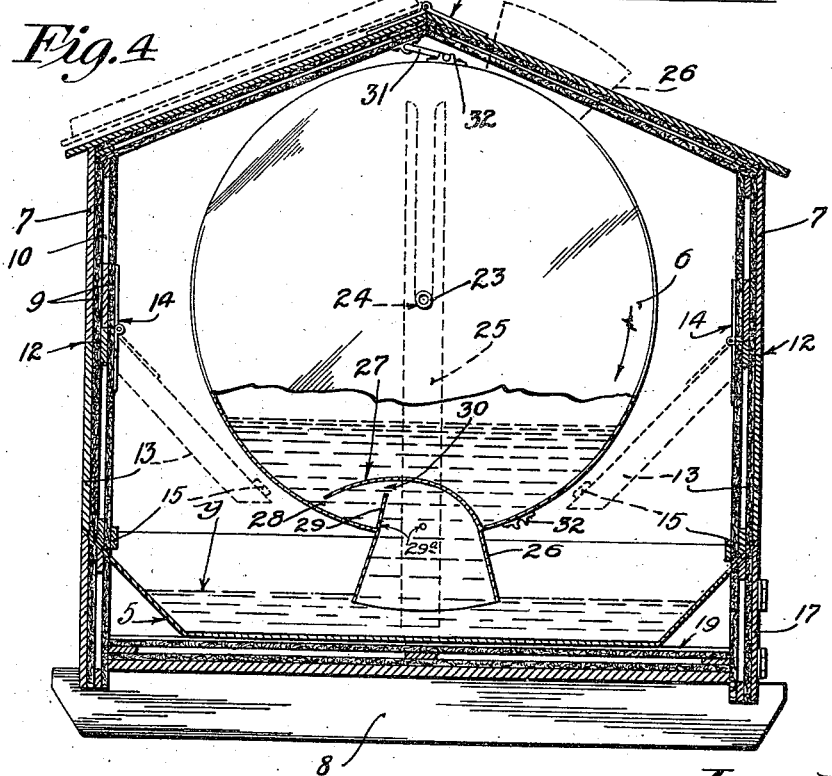
Fig. 4 is a view principally in vertical section taken transversely through the reservoir, with some parts shown in different positions by means of broken lines.

Weights 15 are secured to the lower end portions of the doors 13 to assist in closing the door by gravity. The tops of the doors 13 have rabbeted interlocking engagement with the tops of the door openings 12 and the vertical edges of said doors have beveled engagement with the vertical edges of said door opening 12. As shown in Fig. 4, the bottoms of the doors 13 are inwardly and downwardly beveled at an angle of substantially forty-five degrees. The drinking trough 5 has substantially the same width as the door openings 12 and the length thereof is such as to extend through the house 7 with its end extending into the door openings 12. The ends of the drinking trough 5 slope at the same angle as the bevel on the bottom of the doors 13 and in the same direction, so that when said doors are closed the bottoms thereof closely engage the inner surfaces of the ends of the drinking trough to form tight joints therebetween.

The bottom of one of the door openings 12 is beveled to correspond to its door 13, and the respective end of the drinking trough 5 rests thereon. Under the other door opening 12 is a slightly wider door opening 16, which extends from said door opening 12 to the bottom of the respective side of the house 7 and below the bottom thereof. A door 17, hinged for horizontal swinging movement, normally closes the door opening 16, and the respective end of the drinking trough 5 rests on the top thereof, which is beveled to conform to the bevel on the ends of said trough. The purpose of the door opening 17 is to permit the drinking trough 5 to be removed from time to time, from the house 7, for the purpose of cleansing or repairs. By extending the ends of the drinking trough 5 completely through the door openings 12, there is no chance for water or dirt to get into the interior of the house 7 between the walls thereof and said drinking trough, and it also brings the water closer to the stock drinking at said trough. Also, by supporting the ends of the drinking trough 5 on the beveled bottom of one of the door openings 12 and on the beveled top of the door 17, said ends cannot be broken or bent.

The door 17 is held closed by a latch 18 and the door 13 is arranged to be opened by an animal pressing the same inward with its head and automatically close as soon as the animal is through drinking and removes its head from the door opening.

Figure 3:
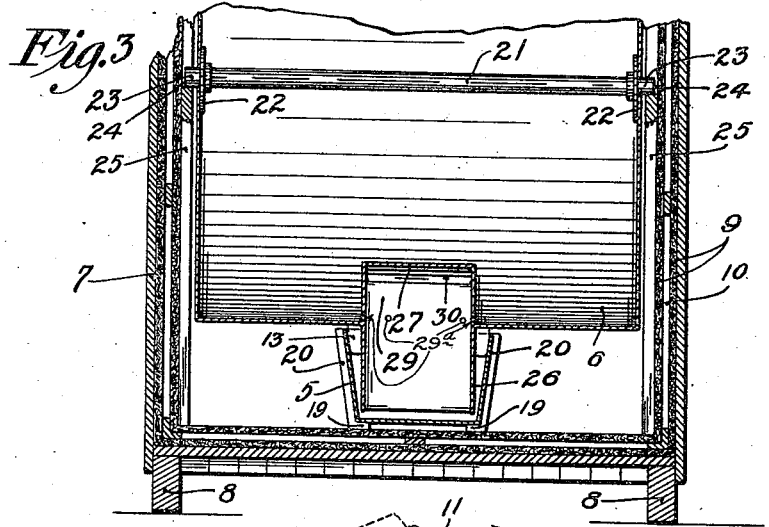
Fig. 3 is a fragmentary view principally in vertical section taken axially through the reservoir.

Rails 19 are secured to the floor of the house 7 on which the drinking trough 5 may be slid into or out of the door opening 16. Supports 20, at the sides of the rails 19, are provided to hold the sides of the drinking trough 5 to prevent the same from spreading. By reference to Fig. 3, it will be noted that the sides of the drinking trough 5, inward of their beveled ends, slightly diverge and the supports 20 are correspondingly inclined.

The reservoir 6 is in the form of a horizontally disposed cylinder through which axially extends a shaft 21, which are secured flanged heads 22 riveted or otherwise rigidly secured thereto. The ends of the shaft 21 are extended outward of the heads of the reservoir to afford a pair of trunnions 23 journaled in open seats 24 formed in posts 25 secured to the ends of the house 7.

A combined filling and discharge cup 26 is secured to the periphery of the shell of the reservoir 6 at the longitudinal center thereof and has a saucer-like bottom 27 located within the reservoir. One edge of the bottom 27 extends materially to one side of the cup 26; i. e. in the direction of the rotation of the reservoir from a filling to an emptying position and is spaced apart from the shell of said reservoir to afford a water passageway 28. A partition 29, which forms an extension of the side of the cup next to the passageway 28, extends into the bottom 27 and its inner edge is spaced apart therefrom to afford a passageway 30. When the reservoir 6 is in a filling position, the passageway 30 is below the passageway 28 to afford a trap which fills with water when the reservoir is being filled and forms a water seal.

A lock 31 is provided for securing the reservoir 6 in either its filling position, as shown by broken lines in Fig. 4, or in its emptying position, as shown by full lines in said figure. This lock 31 is in the form of a straight hook pivoted to the roof of the house 7 and arranged to interlock with either of a pair of circumferentially spaced lock lugs 32 secured to the periphery of the reservoir.

The operation of the improved stock waterer may be briefly described as follows, to wit:—

To fill the reservoir 6, the roof is opened and said reservoir rotated into a position, as indicated by broken lines in Fig. 4, to bring its cup 26 into an upright or filling position. After the reservoir is filled, the same is rotated, in the direction of the arrow marked thereon in Fig. 4, until its neck assumes an emptying position, as shown by full lines in said figure. During the initial movement of the reservoir 6, from a filling to an emptying position, the water seal in the trap of the cup 26 will prevent the escape of air in the reservoir through said cup and hold the same until said trap enters the main body of water. When the cup 26 is in an emptying position, which is within the drinking trough 5, water will flow from the reservoir into said trough until the water reaches approximately the level Y. As the water flows from the reservoir, a partial vacuum is formed therein, which assists in holding the water up in the reservoir and, together with atmospheric pressure on the body of water in the drinking trough, automatically maintain the water level in the drinking trough. When the water in the drinking trough is lowered by stock drinking therefrom, a new supply will be automatically fed from the reservoir to the drinking fountain.

In both the filling position and emptying position of the cup 26, the reservoir 6 is secured by the latch 31. The bottom of the cup 26 also acts as a guard to prevent a flow or splash of water from the reservoir during its movement from a filling to an emptying position. By providing an insulated house for the water reservoir and drinking trough and automatically closing the doors thereof, it is possible to dispense with artificial heat commonly used in stock waterers to prevent freezing.

Small holes $29^a$, formed in the sides of the cup 26 and in the partition 29, as best shown in Fig. 4, permit the escape of air from the reservoir, while the same is being filled through said cup. These small holes $29^a$, in the partition 29, also permit the escape of water from the trap after the reservoir is turned into an emptying position to break the water seal therein and permit the water in the reservoir to flow through the cup 26 and into the trough 5.

What I claim is:—

1. A stock waterer including a drinking trough, a reservoir mounted to turn from a filling to an emptying position and having a combined filling and discharge cup, the bottom of said cup being located within the reservoir and having an opening therein, and a guard arranged, when the reservoir is turned from a filling to an emptying position, to extend above the opening in the bottom of the cup and away from the same in the direction of the turning movement of the reservoir, from a filling to an emptying position.

2. A stock waterer including a drinking trough, a movable reservoir having a combined filling and discharge cup, the bottom of which is located within the reservoir, said cup being arranged, when the reservoir is in an emptying position, to discharge into the trough, a water trap in the bottom of the cup, said trap being at one side of the cup and through which water is discharged into the reservoir in the general direction of the rotation of said reservoir from a filling to an emptying position, and said cup having means for breaking the water seal in the trap when the reservoir is in an emptying position.

3. The combination with a house having in opposite sides door openings and yieldingly closed doors normally closing said openings, of a drinking trough in said house with its ends extending through the side walls of said house flush with the outer surface of the same adapted to allow the drippings to flow back into said trough, said doors arranged to swing within the drinking trough and having beveled lower ends adapted to close against the ends of the trough.

In testimony whereof I affix my signature in presence of two witnesses.

ADOLPH C. WESTBY.

Witnesses:
T. C. WALLACE,
E. C. WESTBY.